Patented Oct. 2, 1923.

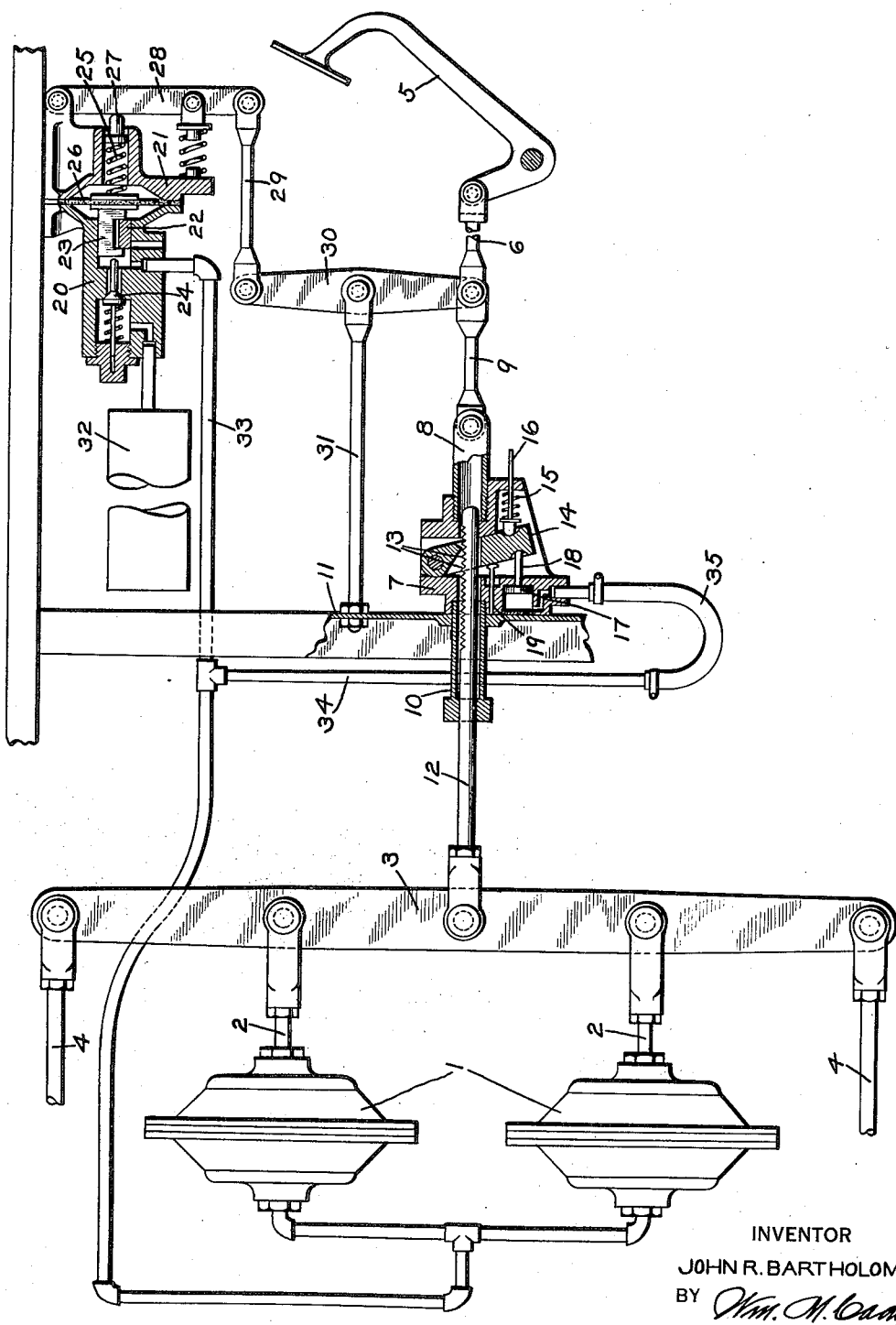

1,469,551

UNITED STATES PATENT OFFICE.

JOHN R. BARTHOLOMEW, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE MECHANISM.

Application filed October 4, 1922. Serial No. 592,239.

*To all whom it may concern:*

Be it known that I, JOHN R. BARTHOLOMEW, a citizen of the United States, residing at Berkeley, in the county of Alameda and State of California, have invented new and useful Improvements in Automotive Brake Mechanism, of which the following is a specification.

This invention relates to fluid pressure brakes, and more particularly to a fluid pressure brake equipment adapted for a motor vehicle.

The principal object of my invention is to provide an improved motor vehicle brake equipment in which the fluid pressure brake is interlocked with the mechanical brake.

Other objects and advantages will appear in the following more detailed description of the invention.

In the accompanying drawing, the single figure is a diagrammatic view, partly in section, of a motor vehicle brake equipment embodying my invention.

As shown in the drawing, the brake equipment may comprise one or more brake chambers 1, each containing a flexible diaphragm (not shown) for operating a push rod 2, which is pivotally connected to an equalizing bar 3. Brake pull rods 4 are pivotally connected to opposite ends of the bar 3 and are operatively connected to the usual brake members (not shown) for controlling the application and release of the brakes.

A pedal lever 5, which may be of the usual construction for operating mechanical brakes on a motor vehicle, is connected to a pull rod 6 and according to my invention, a mechanism is interposed in the mechanical connection from the pedal lever 5 to the equalizing bar 3 for interlocking the operation of the fluid pressure brake with the mechanical brake. Said mechanism may comprise a casing 7 having a tubular extension 8 at one side which is pivotally connected to a link 9, the pull rod 6 being pivotally connected to the link. Secured at the opposite side of the casing 7 and in alinement with the tubular extension 8 is a sleeve 10 adapted to slide in an aperture in a cross member 11 carried by the frame of the motor vehicle.

Mounted in the sleeve 10 is a rod 12 pivotally connected to the equalizing bar 3 at one end and having notches 13 at the other end adapted to be engaged by a pawl 14 pivotally mounted in the casing 7. A spring 15 acts through a pin 16 in the pawl 14 and tends to move the pawl into engagement with one of the notches 13. A piston 17 acts on the pawl 14 through a stem 18 and tends to throw the pawl out of engagement with the notches 13 when fluid under pressure is supplied thereto. A pin 19, loosely mounted in the casing 7 also acts on the pawl 14 and one end of the pin engages the cross member 11, the pin being adapted to throw the pawl 14 out of engagement with the notches 13 when the casing 7 is shifted to its normal release position, as shown in the drawing.

For controlling the admission and release of fluid under pressure to and from the brake chambers 1, a valve device may be provided comprising a casing 20, a casing head 21, and a flexible diaphragm 26 secured between the casing and the casing head and contained in a diaphragm chamber formed by the casing and its head. An exhaust slide valve 22 is operable by a stem 23 secured to said diaphragm and a fluid pressure supply valve 24 is also controlled by the movement of the diaphragm stem 23. A spring 25 acts on the side of the diaphragm opposite the stem 23 and is engaged by a movable member 27. A lever 28, pivotally mounted on the casing head 21, engages the member 27 and said lever 28 is connected through a link 29 with one end of a lever 30 which is fulcrumed on a rod 31, secured to the cross member 11.

The opposite end of the lever 30 is pivotally connected to the rod 6, so that the movement of the pedal lever 5 operates the lever 30.

In operation, if it is desired to apply the brakes on the motor vehicle, the pedal lever 5 is depressed by the foot of the operator and thereby the lever 30 operates, with the rod 31 acting as a fulcrum, to exert a pull on the rod 29, causing the lever 28 to depress the member 27. The spring 25 is thereby compressed a certain amount and the diaphragm 26 is moved so that the stem 23 engages and opens the valve 24. Fluid under pressure is then supplied from the supply reservoir 32 to pipe 33 and thence to the brake chambers 1. Fluid supplied to the brake chambers 1 causes the outward movement of the diaphragm rods 2 so that the equalizing bar 3 operates through the brake pull rods 4 to apply the brakes.

When the pedal lever 5 is depressed, the link 9 is also pulled forward by the rod 6 and thereby the casing 7, but it will be noted that the pawl 14 is held free from engagement with the notches 13 in the rod 12 by the action of the pin 19 during the initial movement of the pedal lever.

If the fluid pressure mechanism operates as intended to supply fluid under pressure for applying the brakes, then fluid is also supplied from pipe 33 through a branch pipe 34 having a flexible section 35 to the piston 17, so that as the casing 7 is pulled forward by the movement of the pedal lever, the pawl 14 is maintained out of engagement with the notches 13 by fluid pressure acting on piston 17 to hold the stem 18 in engagement with the pawl.

If, however, for any reason, the fluid pressure brake should fail to act, then since no fluid pressure will be supplied to the piston 17, the outward movement of the casing 7 will release the pin 19 and permit the spring 15 to act so as to force the pawl 14 into engagement with the rod 12. It will thus be seen that in this case, the continued movement of the pedal lever 5 will be effective to exert a pull on the rod 12 and thereby the equalizing bar 3 will be mechanically operated to apply the brakes.

With the fluid pressure brake operating, when the pressure supplied to the brake chambers 1 has been raised to a point slightly exceeding the pressure of the spring 25, the brake chamber pressure acting on the diaphragm 26 operates to shift the diaphragm so as to permit the valve 24 to close.

If desired, the braking pressure may be increased by further depressing the pedal lever 5 so as to effect a further compression of the spring 25 and thus cause a movement of the diaphragm 26 to again open the supply valve 24.

The brakes may be released by relieving the foot pressure on the pedal lever 5 so that the compression of the spring 25 being reduced, the diaphragm 26 will be moved by the brake chamber pressure acting on the opposite side to open the exhaust valve and thereby permit the exhaust of fluid from the brake chambers through the open exhaust port 36.

It will now be seen that with the above described construction, the operator may apply the brakes normally by fluid under pressure by operating the pedal lever 5, but if, for any reason, the fluid pressure brake should fail to function, then the brakes will be mechanically applied by the movement of the pedal lever through the automatic operation of the interlock device.

It will be understood that the manual control may be effected by mechanism adapted to be operated either by the hand or the foot of the operator.

Having now described my invention, what I claim as new and desire to secure by Letters Patent, is:—

1. In a motor vehicle brake, the combination with mechanically operated means for controlling the brakes and manually operated means for operating said mechanical means, of a mechanism controlled by fluid under pressure for operatively connecting said manually operated means with said mechanically operated means.

2. In a motor vehicle brake, the combination with manually operated means for controlling the brakes mechanically and fluid pressure operated means controlled by said manually operated means for also controlling the brakes, of fluid pressure controlled means for preventing the mechanical operation of the brakes by said manually operated means.

3. In a motor vehicle brake, the combination with a fluid pressure brake and manually operated means for controlling the fluid pressure brake and for operating the brakes mechanically, of means for operatively connecting said manually operated means to operate the brakes mechanically and a device operated by fluid pressure supplied to the fluid pressure brake for operating said connecting means to prevent the mechanical operation of the brakes by said manually operated means.

4. In a motor vehicle brake, the combination with a manually operated member, a member operative to mechanically control the brakes, and a locking member for connecting said manually operated member with said braking member, of a movable abutment operated by fluid under pressure for preventing the operation of said locking member.

5. In a motor vehicle brake, the combination with a manually operated member, a member operative to mechanically control the brakes, and a locking member carried by said manually operated member for engaging said braking member, of a movable abutment operated by fluid under pressure for preventing engagement of said locking member with said braking member.

6. In a motor vehicle brake, the combination with a manually operated member, a member operative to mechanically control the brakes, and a locking member carried by said manually operated member for engaging said braking member, of a fluid pressure brake and a movable abutment operated by fluid under pressure from said fluid pressure brake for preventing engagement of said locking member with said braking member.

In testimony whereof I have hereunto set my hand.

JOHN K. BARTHOLOMEW.